United States Patent [19]
Flisch

[11] 3,744,355
[45] July 10, 1973

[54] MULTIPLE SPINDLE LATHE
[75] Inventor: Hermann Flisch, Maienfeld, Switzerland
[73] Assignee: Eunipp A. G., Zug, Switzerland
[22] Filed: Nov. 27, 1970
[21] Appl. No.: 93,072

[30] Foreign Application Priority Data
Dec. 3, 1969 Switzerland...................... 18102/69

[52] U.S. Cl................................. 324, 82/25, 82/19
[51] Int. Cl................................................ B23b 9/00
[58] Field of Search .................... 82/3, 19, 25, 2 D; 29/37, 37 A

[56] References Cited
UNITED STATES PATENTS
3,245,290  4/1966  Johansson................................. 82/3
3,250,159  5/1966  Bergonzo................................ 82/25
1,945,663  2/1934  Smith et al............................... 82/3
3,308,693  3/1967  Bechler................................... 82/25

FOREIGN PATENTS OR APPLICATIONS
616,535  7/1935  Germany................................ 82/25

Primary Examiner—Leonidas Vlachos
Attorney—Lackenbach & Lackenbach

[57] ABSTRACT

Multiple spindle automatic lathe having two tool slides associated with each spindle position for radial movement relative the spindle axis.

12 Claims, 5 Drawing Figures

Patented July 10, 1973

INVENTOR
HERMANN FLISCH
BY
Rackenbach + Rackenbach
ATTORNEYS

MULTIPLE SPINDLE LATHE

The present invention relates to lathes and, more particularly, to multiple spindle automatic lathes.

In multiple spindle automatic lathes or machines, a plurality of spindles for simultaneously rotating a number of work pieces or lengths of bar stock are mounted in a generally cylindrical pattern in a spindle carrier which itself is rotatable about its central axis so that the spindles may be sequentially indexed or advanced to each of the spindle positions. Opposite each spindle position are tool slides carrying the necessary tools for the respective operations. The tool slides do not index or revolve with the spindle carrier so that as the spindle carrier is indexed by steps, the work pieces or lengths of bar stock in each of the work spindles is brought successively in line with the various tools mounted on the tool slides and the work pieces or bars in each spindle are machined simultaneously. As an individual work piece or bar is indexed through the various positions it is therefore worked on sequentially by each of the tools and a finished piece is produced with each advance of the spindle carrier.

In heretofore known machines of this type, however, each spindle position has only a single tool slide radially movable relative to spindle axis. Consequently, the number of radial machining operations that can be performed with such machines is limited to the number of spindles or spindle positions available. In order to machine complex work piece shapes with such machines, supplemental tooling having separate drives must be mounted on the tool slides but successful operation thereof is frequently difficult.

Having in mind the foregoing, it is a primary object of the present invention to provide multiple spindle machines having increased tool capacity.

Another primary object of the present invention, in addition to the foregoing object, is the provision of such machines wherein more than a single tool slide is associated for radial movement relative at least one of the spindle positions.

Yet another primary object of the present invention, in addition to the foregoing objects, is the provision of such machines wherein a plurality of tool slides are provided capable of radial movement relative each of the spindle positions.

Still another primary object of the present invention, in addition to each of the foregoing objects, is the provision of such machines having a pair of tool slides movable radially at each of the spindle positions.

Yet still another primary object of the present invention, in addition to each of the foregoing objects, is the provision of such machines wherein a single cam may be utilized to move two tool slides radially of a single spindle position.

Yet still another primary object of the present invention, in addition to each of the foregoing objects, is the provision of such machines having a single cam for simultaneously advancing one tool slide and retracting a second tool slide radially of a single spindle position.

Still further, it is yet another primary object of the present invention, in addition to the foregoing objects, to provide such machines wherein a single cam actuates a pair of rocker arms for simultaneously moving a pair of tool slides radially of a single spindle position.

Another and yet still further primary object of the present invention, in addition to the foregoing objects, is the provision of such machines wherein the rocker arms are independently adjustable.

Yet still another primary object of the present invention, in addition to the foregoing objects, is the provision of such machines wherein such rocker arms provide movement of such slides in one direction and a spring provides movement thereof in the opposite direction and wherein the movement direction to be provided by the rocker arms is selectable.

Still another primary object of the present invention, in addition to each of the foregoing objects, is the provision of such machines which are economical to manufacture, easily set up and adjusted, and sturdy and efficient in use.

The invention resides in the combination, construction, arrangement and disposition of the various component parts and elements incorporated in improved lathes constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In accordance with the present invention, two tool slides movable transversely to the spindle axis are associated with each spindle position. This provides the capability of rapidly, easily and efficiently producing work pieces of complex shape without auxiliary or supplemental tooling.

Figure 1:
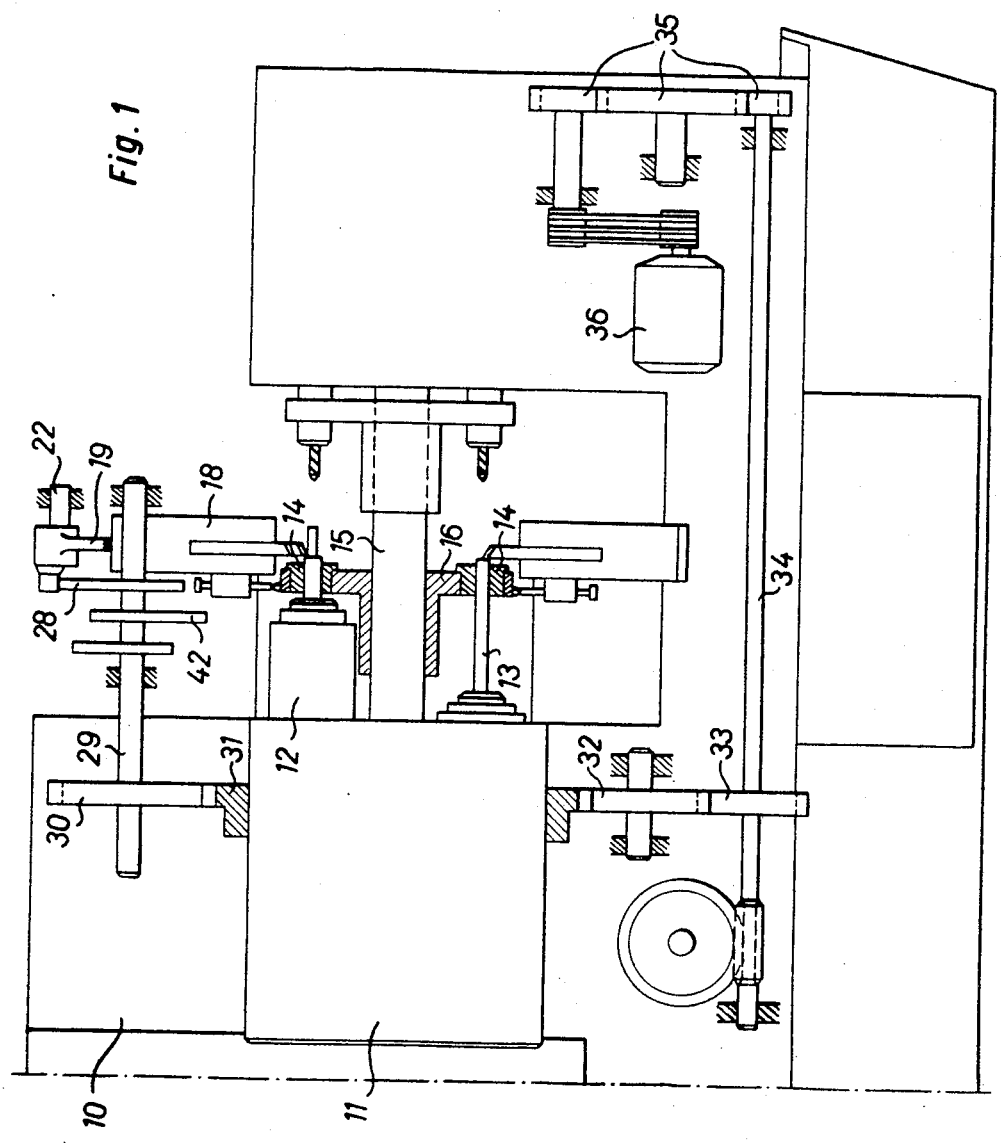
FIG. 1 is a diagrammatic side elevational view of a multiple spindle machine constructed in accordance with the present invention.

With reference now to the drawing, there is shown and illustrated a multi-station automatic bar machine or lathe which may comprise a machine frame or column 10 which rotatably supports a spindle carrier or drum 11 and which in turn rotatably carries six hollow spindles 12 which are provided with means for advancing and clamping work piece bars 13 in a manner generally known. The portions of the bars 13 which project from the front ends of the spindles 12 may be guided in support bearings or bushings 14. A central tube 15 extends generally axially into the spindle carrier 11 and may have a shaft (not shown) extending therethrough for providing rotation of the spindles 12 through gearing contained within the spindle carrier 11 in a wellknown manner. A supporting member 16 may be carried by the central tube 15 for supporting the bearings 14.

Figure 2:
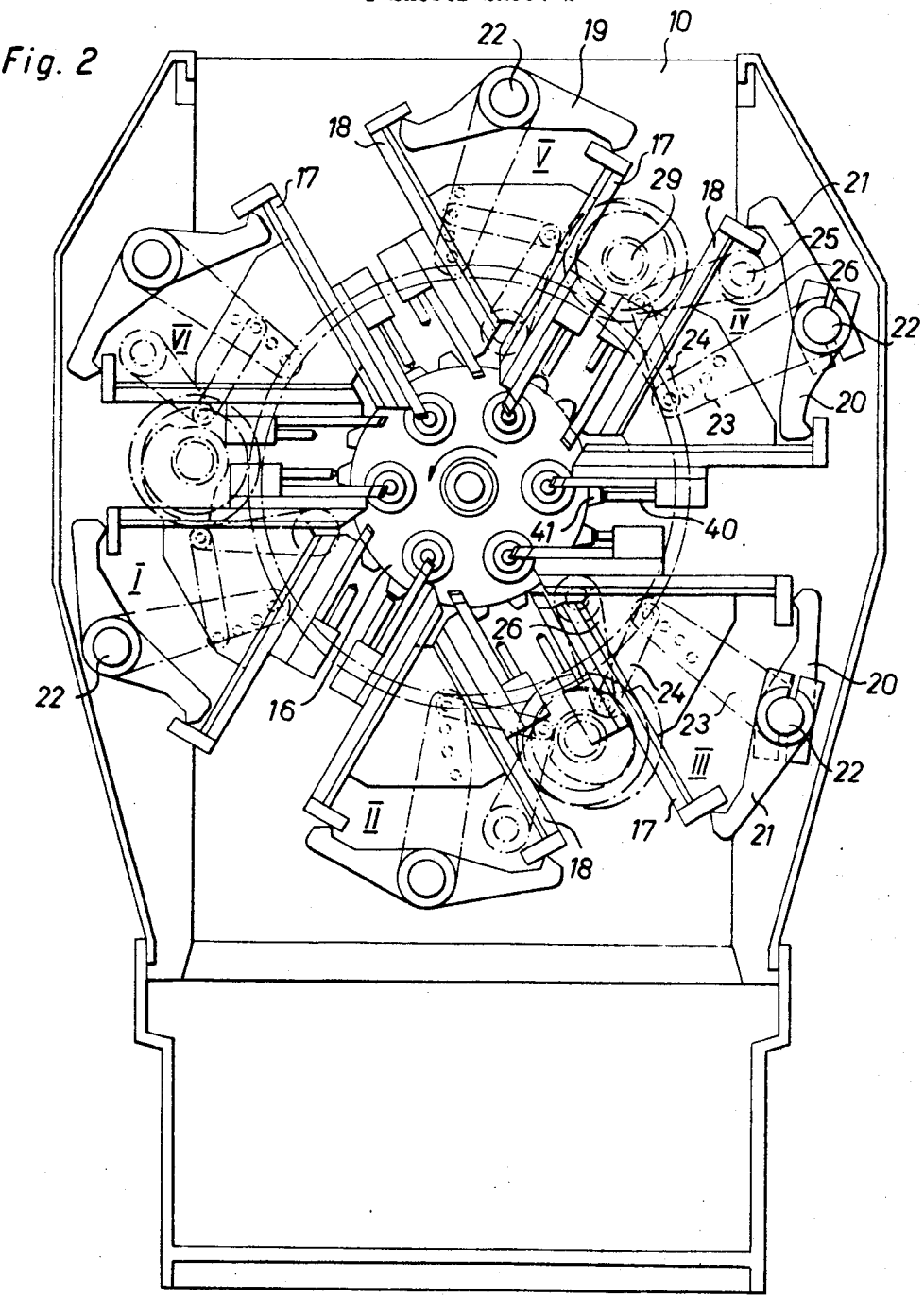
FIG. 2 is an elevational view along line 2—2 of FIG. 1 showing the head stock and tool slides of the machine.

With particular reference to FIG. 2, each of the six spindle positions, identified by Roman numerals I through VI may have associated therewith two tool slides 17 and 18 which are movable radially of each spindle axis. The slides 17 and 18 are each radially adjustable relative to the respective spindles 12 when located in the corresponding spindle working positions and, since the slides are movable generally transversely of the rotational axes of the machine, will be hereinafter briefly designated as being transverse slides.

Each set of transverse slides 17 and 18 associated with a single spindle position may be controlled and moved by rocker arms which may comprise a two-armed lever 19 as shown at spindle position V or may comprise separate rocker arms or one-armed levers 20 and 21, as shown associated with spindle position IV carried by a single axle 22. Each of the spindle positions I through VI has associated therewith a single axle 22 and a pair of rocker arm portions which, as pointed out above, may comprise a single two-armed lever or two one-armed levers carried by the common axle 22. The rocker arms 19, 20 and 21 are mounted for rotation with the respective axles 22. Also mounted with each axle 22 for movement therewith are levers 23 having adjustably connected therewith one end portion of an adjustable rod or length 24, the other end of which is constrained to rotate about a fixed axle 25, as by being connected with levers 26 rotatable about the axis of the stationary axles 25. The outer end portion of the levers 26, i.e., the end portions thereof spaced apart from the stationary axles 25 are each provided with rollers 27 which each engage a control cam 28 rotatably carried by control shafts 29. As shown, three control shafts 29 may be provided arranged around the circumference of the spindle drum or carrier spaced apart by 120° each. Attached to each of the control shafts 29 there may be provided gears 30 which mesh with a ring gear or toothed rim 31 rotatably carried surrounding the spindle carrier or drum 11. Meshed with the ring gear or gear rim 31, there may be provided a gear train comprising, for example, an idler gear 32 and a driving gear 33 carried by and rotatable with a principal control shaft 34 which is in turn driven, as by means of change speed gearing 35, by a motor 36. Hence, as the principal control shaft 34 is revolved by the motor 36, the ring gear 31 will also rotate about the spindle drum or carrier 11 rotating, in turn, the cams 28 which will cause the associated rocker arm to oscillate about the axis of the shaft 22. The range of oscillation may be readily adjusted by adjustment of the link or adjustable rod 24 with the lever 23 and the starting and ending position of the rocker arm may be readily and easily adjusted by adjusting its angular position relative the lever 23 either by adjusting the angular position of the shaft 22 relative the corresponding lever 23 or by adjusting the angular position of the rocker arm relative the shaft 22. It is to be noted that by adjusting the angular relationship between the rocker arm and the lever 23 and by the adjustment of the adjustable rod or link 24, both the extremes and the range of oscillation may be completely adjusted without requiring any modification of the cam and by a proper selection of the change speed gearing 35, the rate of movement may also be controlled.

The movement of the rocker arms, whether comprising a single two-armed lever such as the lever 19 or two single-armed levers, such as the levers 20 and 21, may be utilized to move the transverse tool slides 17 and 18 in several different manners, namely, to provide either a powered advance or movement of the transverse slides towards the axis of the corresponding spindle or to provide powered retraction, that is, movement of the respective tool slides radially outwardly away from the axis of the corresponding spindle. Further, the double ended rocker arm may be utilized to provide powered movement of the corresponding tool slide in either the same or opposite directions. Movement of the slides in the reverse directions may be provided, for example, by means of springs. Further, machining may be performed either during the powered stroke or the spring controlled stroke.

Figure 3:
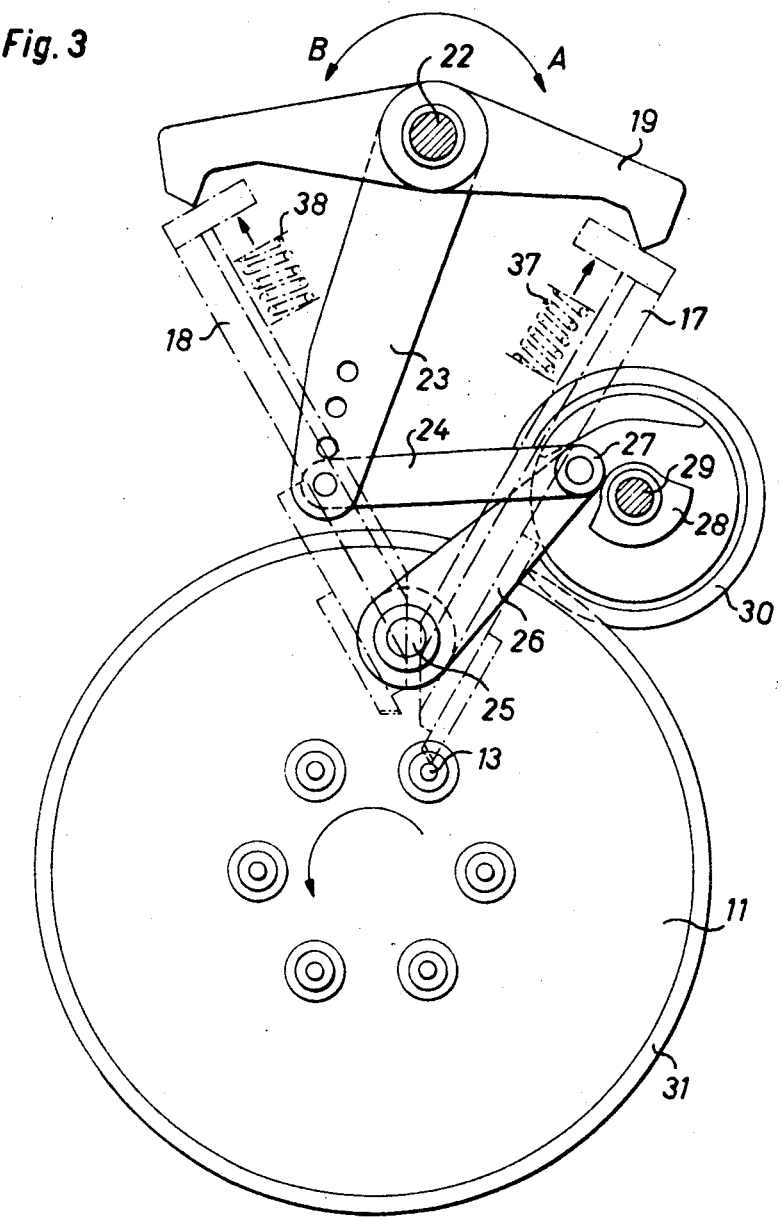
FIG. 3 is a diagrammatic partial illustration similar to FIG. 2 showing in more detail one embodiment of tool slide control.

With more particular reference to FIG. 3, which more clearly diagrams the setup of FIG. 2, Stations II and III, wherein powered advance is provided to both tool slides, there is indicated diagrammatically a spring 37 associated with the tool slide 17 and a spring 38 associated with the tool slide 18 opposing the movement of the two-armed lever 19. It is to be particularly noted that the cam 28 is, as illustrated, preferably a face cam having a generally central portion adapted to engage the roller 27 particularly for moving the roller 27 radially outwardly of the axis of the shaft 29 and a second, spaced apart cooperating or corresponding peripheral portion for moving the roller 27 radially inwardly. Since the central and peripheral portions may extend generally axially forwardly of a cam face and axially define a channel therebetween within which the roller 27 must move, particularly during retraction, the cam 28 illustrated is a face cam, although the path of the roller is not completely determined thereby but is partially determined by the resistance to the machining tools and the return springs 37 and 38.

If the rocker arms, whether comprising the two-armed lever 19 shown and illustrated in FIG. 3 or the combined two onearmed levers 20 and 21 shown in FIG. 2 associated with spindle position III, is swung in the direction designated by the arrow head A and corresponding to outward movement of the cam follower or roller 27, the transverse slide 17 will move radially inwardly toward the work piece 13, stressing the spring 37 while the other transverse slide 18 will be moved outwardly away from the work piece 13 by the action of the spring 38. Conversely, when the lever 19 is swung in the direction indicated by the other arrow head D, corresponding to inward movement of the cam follower or roller 27, the transverse slide 18 will be moved toward the work piece 13 stressing the spring 38 and the transverse slide 17 will be at the same time moved away from the work piece by the action of the spring 37. The magnitude of the two slide advances is thus determined by the swinging angle of the lever 19. If the machining performed is an inward cut, as would be produced by the illustrated cutting tools, then the outward force generated by the cutting action would be opposed completely by the cam and follower arrangement and the springs 37 and 38 would be utilized solely and entirely to retract the tool slides which is the usual procedure. If the cuts to be preformed were internal, then the lever arm 19 could be reversed to provide powered outward movement of both slides and the springs 37 and 38 utilized to retract the slides inwardly.

Figure 4:
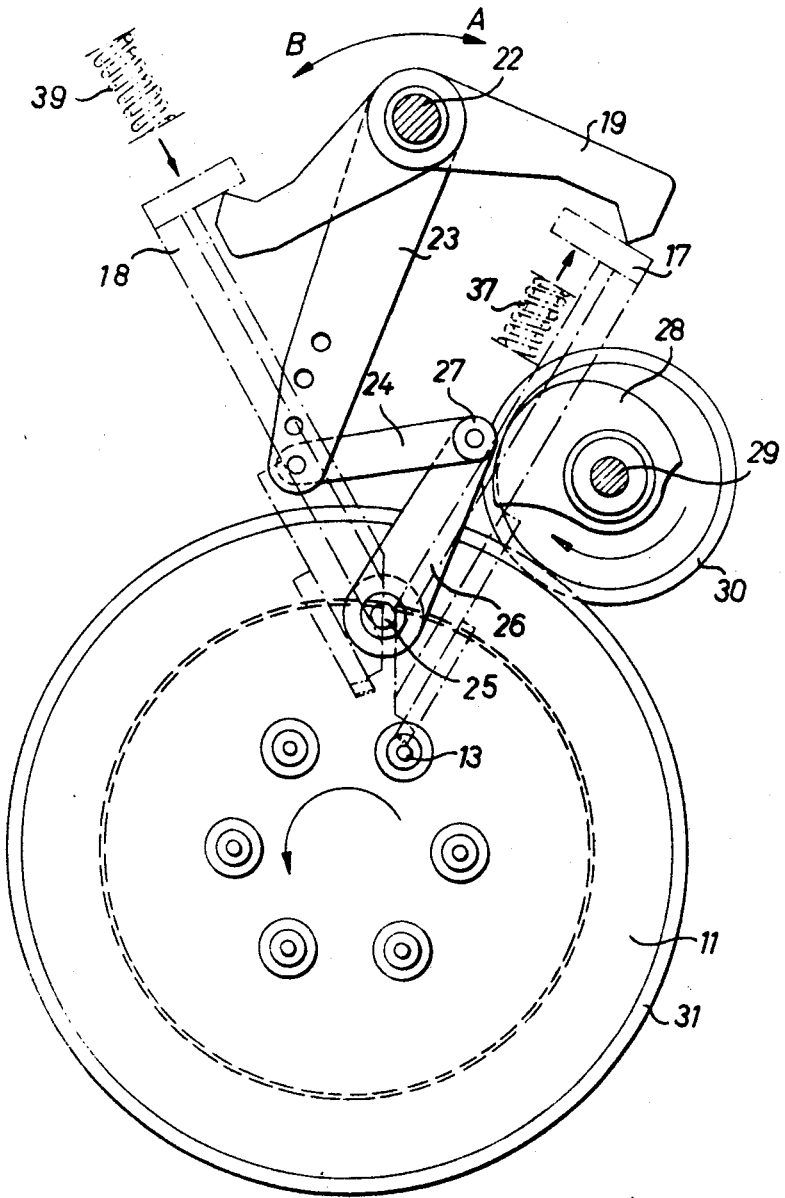
FIG. 4 is a view similar to FIG. 3 showing another embodiment of tool slide control.
Figure 5:
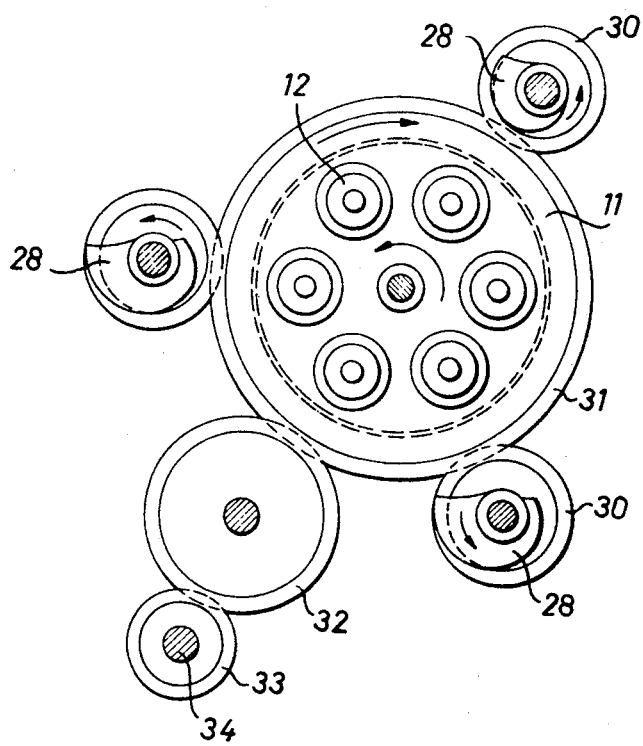
FIG. 5 is a diagrammatic view of the drive means for the tool slide control cams.

With reference now to FIG. 4, there is shown a diagram similar to FIG. 3 but corresponding to positions I, V and VI in FIG. 2, swinging of the lever 19 in the direction indicated by the arrow head will move the transverse slide 17, as in the previous discussion, toward the work piece against the action of a spring while the other transverse slide 18 is at the same time moved outwardly away from the work piece, stressing a spring 39 disposed outwardly thereof. In this case, it is to be noted that the action of both the springs 37 and 39 is in a direction tending to force the cam follower or roller radially inwardly of the cam 28 so that only a central cam portion is necessary. It is to be further noted here that while a substantially complete range of movements may be determined utilizing a single cam and appropriately adjusting the rocker arm and adjusting rod 24, different cam profiles may also be utilized for differing machining operations. The movement of the lever 19 in the direction indicated by the arrow *b* is, therefore, under the power of the springs 37 and 39 although limited and controlled by the cam 28. The advance of the transverse slide 17 is here effected by the swivelling path of the lever 19 while that of the transverse slide 18, however, is by the stressed spring 39. The slide advances caused by the springs that operate radially inwardly may be limited by adjustable stop bolts 40 provided on the transverse slides and by stationary stops 41 provided on the circumference of the supporting member 16. A high degree of accuracy of work piece machining can thus be achieved.

On the other hand, if radial operations such as recessing or severing of the work piece are to be performed, the transverse slide involved will preferably be moved towards the work piece by a lever arm swung from an outside to an inside position.

In the spindle positions III and IV of FIG. 2, two levers 20 and 21 are adjustably mounted on a common axle 22, as hereinbefore pointed out. This enables accurate adjustment of the slide paths to the type of operation to be performed.

In all the arrangements of the levers 19 and, respectively, 20 and 21, the transverse slides 17 and 18 are always moved in opposite directions so that the tools mounted thereon engage the work piece consecutively. If the transverse slides 17 and 18 are associated with a single spindle position and their tools are to be moved towards and again away from the work piece simultaneously, two one-armed levers 20 and 21 which can be swung independently may be provided and a second control cam 42 (FIG. 1) may be attached to the control shaft 29 of that spindle position. The arrangement of the tool slides and the control according to this invention thus enables optimum adjustment to all possible operations to be achieved.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. In a multi-spindle automatic lathe having the spindles carried generally cylindrically in a rotatable spindle carrier drum for indexing to a plurality of spindle positions, the improvement comprising a pair of transverse tool slides mounted adjacent each spindle position independent of said carrier drum beyond the range of displacement of the rotating spindles and common slide moving means for moving all of said slides radially of the respective spindle axes simultaneously wherein said common slide moving means comprises a rotatable shaft extending generally parallel the spindle axis associated with each of said pairs of tool slides and a pair of rocker arms carried by each rotatable shaft having a portion connected, respectively, with each of said slides to move said slides upon rotation thereof and common drive means for simultaneously rotating all of said shafts.

2. Lathe defined in claim 1 wherein one of said pairs of rocker arms comprises one rocker arm portion for urging one of said slides inwardly of the spindle axis upon rotation in one direction and a second rocker arm portion for urging the other of said slides outwardly of the spindle axis upon rotation in the same direction.

3. Lathe defined in claim 2 wherein said moving means further comprises a first spring operating radially outwardly and operatively connected with said one slide for urging said slide outwardly against said one rocking arm portion and a second spring directed inwardly and operatively connected with said other slide for urging said other slide inwardly against said second rocker arm portion.

4. Lathe defined in claim 3 further comprising adjustable stop means arranged on said slides and fixed stationary stops for engagement thereby to limit inward movement of said other slide.

5. Lathe defined in claim 1 wherein one of said pairs of rocker arms comprises generally opposed rocker arm portions connected with the respective slides for alternately urging each of said slides radially inwardly of the spindles upon rotation thereof in opposite directions.

6. Lathe defined in claim 5 wherein said moving means further comprises a pair of springs operative radially outwardly and operatively connected with each of said slides for urging said slides outwardly against said rocker arm portions.

7. Lathe defined in claim 1 wherein one of said pairs of rocker arms comprises generally opposed rocker arm portions connection with the respective slides for alternately urging each of said slides radially outwardly of the spindles upon rotation thereof in opposite directions.

8. Lathe defined in claim 7 wherein said moving means further comprises a pair of springs operative radially inwardly and operatively connected with each of said slides for urging said slides inwardly against said rocker arm portions.

9. Lathe defined in claim 8 further comprising adjustable stop means operatively associated with said slides and fixed stationary stop means for engagement thereby for limiting inward movement of said slides under urging of said springs.

10. Lathe defined in claim 1 wherein said common drive means comprises a ring gear rim extending generally concentrically around the spindle carrier drum, gear means for driving said ring gear rim, cam and follower means connected with each of said shafts for providing rotation thereof and pinion gear means operatively coupling said cams and ring gear rim for movement thereby so that rotation of said ring gear rim provides simultaneous rotation of said cams to produce simultaneous rotation of said shafts and rocker arms and reciprocating movement of said slides therefrom.

11. Lathe defined in claim 10 wherein said cam follower means comprises a face cam and roller follower.

12. Lathe defined in claim 11 wherein said gear ring rim is rotatably carried by the spindle carrier drum.

* * * * *